(12) United States Patent
Seid (10) Patent No.: US 8,802,190 B2
(45) Date of Patent: Aug. 12, 2014

(54) WELDABLE CORROSION RESISTANT COATING FOR STEEL AND METHOD OF MANUFACTURE

(75) Inventor: Alan Seid, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 36 days.

(21) Appl. No.: 13/180,537

(22) Filed: Jul. 11, 2011

(65) Prior Publication Data
US 2013/0017327 A1    Jan. 17, 2013

(51) Int. Cl.
| | | |
|---|---|---|
| B32B 15/01 | (2006.01) | |
| C23C 14/16 | (2006.01) | |
| C23C 28/00 | (2006.01) | |
| C23C 30/00 | (2006.01) | |

(52) U.S. Cl.
USPC ............ 427/190; 427/196; 427/202; 427/379

(58) Field of Classification Search
CPC ........ B32B 15/01; C23C 14/16; C23C 28/00; C23C 30/00
USPC .................................. 427/190, 196, 202, 379
See application file for complete search history.

(56) References Cited

U.S. PATENT DOCUMENTS

| | | |
|---|---|---|
| 2,289,614 A | 7/1942 | Andrew et al. |
| 4,086,153 A | 4/1978 | Ariga et al. |
| 4,097,351 A | 6/1978 | Caley et al. |
| 4,156,040 A | 5/1979 | Swider et al. |
| 4,350,719 A | 9/1982 | Baldi |
| 4,464,430 A | 8/1984 | Baldi |
| 4,542,048 A | 9/1985 | Nickola et al. |
| 4,678,717 A * | 7/1987 | Nickola et al. ................ 428/553 |
| 5,116,672 A | 5/1992 | Mosser et al. |
| 5,409,970 A | 4/1995 | Mosser et al. |
| 5,976,419 A | 11/1999 | Hawkins et al. |
| 6,231,789 B1 | 5/2001 | Hawkins et al. |
| 6,372,299 B1 * | 4/2002 | Thompson et al. ........... 427/456 |
| 6,440,332 B1 | 8/2002 | Geer et al. |
| 6,627,117 B2 | 9/2003 | Geer et al. |
| 7,074,348 B2 * | 7/2006 | Geer et al. ..................... 252/500 |
| 7,078,076 B2 | 7/2006 | Maze et al. |
| 7,264,661 B2 | 9/2007 | Maze et al. |
| 7,595,009 B2 | 9/2009 | Geer et al. |
| 2007/0172680 A1 | 7/2007 | Maze et al. |
| 2009/0078155 A1 | 3/2009 | Maze et al. |

FOREIGN PATENT DOCUMENTS

JP          60-155853 A        8/1985

* cited by examiner

*Primary Examiner* — Timothy Meeks
*Assistant Examiner* — Ann DiSarro
(74) *Attorney, Agent, or Firm* — Capitol City TechLaw, PLLC; Mark E. Duell (57) ABSTRACT

The disclosure is directed the formulation and application of an anti-corrosion coating system for use on an associated metallic substrate, the coating composition including at least a sacrificial binder and particles of at least one metallic compound comprising a metal which is anodic relative to the metallic substrate. The associated method includes the steps of applying the coating system to the metallic substrate to form an initial coating, heating this initial coating to remove the sacrificial binder and continued heating under controlled atmospheric conditions sufficient to reduce the metallic compound(s) to elemental metal and form a corrosion suppressing alloy coating on the metallic substrate.

20 Claims, 6 Drawing Sheets

WELDABLE CORROSION RESISTANT COATING FOR STEEL AND METHOD OF MANUFACTURE

TECHNICAL FIELD

The present disclosure relates to improved corrosion resistant coatings and methods for forming such coatings on base metal components. More particularly, the present disclosure relates to improved corrosion resistant coatings and methods for forming such coatings that produce a well-bonded, weldable coating with improved composition control suitable for treating vehicular components.

BACKGROUND OF THE INVENTION

Corrosion is the disintegration of a base material as a result of chemical reactions with the surrounding environment(s) and generally refers to the electrochemical oxidation of metals resulting from contact with an oxidant such as oxygen or chlorine. Given the importance of metals in manufacturing and the exposure of the manufactured articles to a range of corrosive environments, methods and materials for controlling or suppressing corrosion are of continued interest in many industries.

Rusting of an iron or steel substrate is an electrochemical process that begins with the transfer of electrons from iron to oxygen, the rate of corrosion being affected by a number of factors including the presence of water and any electrolytes. The key reaction is the reduction of oxygen according to Reaction I:

$$O_2 + 4e^- + 2H_2O \rightarrow 4OH^- \qquad (I)$$

Because it forms hydroxide ions, this process is strongly affected by the presence of acid. And, indeed, the corrosion of most metals is accelerated under lower pH conditions. Providing the electrons for Reaction I is the oxidation of iron that may be described as follows:

$$Fe \rightarrow Fe^{2+} + 2e^- \qquad (II)$$

The redox reaction illustrated in Reaction III also occurs in the presence of water and is crucial to the formation of rust:

$$4Fe^{2+} + O_2 \rightarrow 4Fe^{3+} + 2O^{2-} \qquad (III)$$

Additionally, the following multistep acid-base reactions as illustrated in Reactions IV and V can affect the rate of rust formation:

$$Fe^{2+} + 2H_2O \rightleftharpoons Fe(OH)_2 + 2H^+ \qquad (IV)$$

$$Fe^{3+} + 3H_2O \rightleftharpoons Fe(OH)_3 + 3H^+ \qquad (V)$$

as do the dehydration equilibria illustrated in Reactions VI-VIII:

$$Fe(OH)_2 \rightleftharpoons FeO + H_2O \qquad (VI)$$

$$Fe(OH)_3 \rightleftharpoons FeO(OH) + H_2O \qquad (VII)$$

$$2FeO(OH) \rightleftharpoons Fe_2O_3 + H_2O \qquad (VIII)$$

From the reactions detailed above, it may be appreciated that the corrosion products are dictated in large part by the availability of both water and oxygen. Accordingly, in those instances with limited dissolved oxygen, the formation of iron (II)-containing compounds will be favored including, for example, FeO and black lodestone ($Fe_3O_4$). Higher oxygen concentrations tend to favor the formation of ferric materials that generally fall within a nominal formula that can be expressed as $Fe(OH)_{3-x}O_{x/2}$. Furthermore, these complex "rusting" reactions will be affected by the presence of other ions including, for example, $Ca^{2+}$, which can serve a double role as both an electrolyte, which tends to accelerate rust formation, and as a reactant species capable of combining with the hydroxides and oxides of iron to form precipitates comprising a range of Ca—Fe—O—OH species.

One method of protecting metals from corrosion involves forming a barrier coating in order to separate the metal from the surrounding and potentially corrosive environment. Examples of such barrier coatings include paints and nickel and chrome plating. Paints can be problematic for those components that will be subsequently subjected to one or more high temperature processes including, for example, welding and/or heat treating. Further, as with all barrier coatings, defects in or damage to the barrier coatings leave the underlying metal substrate susceptible to corrosion. Further, electrochemically active barrier coatings including, for example, nickel, chrome, and conductive polymer layers, can actually accelerate corrosion of underlying metals once an opening is formed in the coating.

Other coatings used to protect metal substrates include sacrificial coatings in which the coating material(s) react with the environment and is consumed while leaving the underlying substrate substantially intact. These sacrificial coatings may be subdivided into chemically reactive coatings including, for example, chromate coatings, and electrochemically or galvanically active coatings including, for example, aluminum, cadmium, magnesium, zinc and combinations thereof. The galvanically active coatings must be conductive and are commonly referred to as "cathodic" protection.

In the art, a major difficulty has been the creation of a coating that protects like a cathodic system but is applied with the ease of a typical barrier coating system. Furthermore, there are many environmental drawbacks associated with traditional barrier and sacrificial methods including, for example, high levels of volatile organic compounds, toxic or suspect compounds and/or expensive waste treatment and environmental requirements.

The present invention contemplates an improved anti-corrosion coatings and methods of forming such coatings which address some of the limitations and concerns associated with conventional coating methods while providing improved coating performance.

DISCUSSION OF RELATED ART

U.S. Pat. No. 7,678,184 describes an anti-corrosion coating for protecting steel parts which utilizes a composition of particulate metal in a liquid medium that is applied to the substrate and cured to form a protective layer. The particulate metal utilized in the composition comprises at least 50 wt % zinc alloy in flake form, the balance being a non-zinc alloy metal.

U.S. Pat. No. 6,440,332 describes a cathodic corrosion resistant coating system that can be applied to a metal substrate in a more environmentally sound manner. More particularly, the coating system utilizes a curable polymer composition in combination with galvanically anodic metals dispersed in a resin matrix and applied to a metal substrate to create a corrosion resistant cathodic coating. As detailed in the specification, the disclosed coating composition included 1) a resin binder, 2) an inherently conductive polymer, 3) metallic particles which are anodic to the metallic substrate and 4) a curing agent. The disclosed method included the steps of 1) mixing the inherently conductive polymer with the metallic particles at relatively low temperatures (from about 100° F. to 220° F.) to form an inherently conductive polymer/ metal particle complex, 2) providing a resin binder selected from the group consisting of water-borne resin systems and solvent-borne resin systems, 3) providing a curing agent, and 4) mixing the blend, the resin binder, and the curing agent to form the coating system that is then applied to the associated metallic substrate.

BRIEF SUMMARY OF THE DISCLOSURE

One aspect of the disclosure is directed a method of formulating and applying a coating system adapted for use on an associated metallic substrate, the coating system including a sacrificial binder and particles of at least one metallic compound comprising a metal which is anodic relative to the metallic substrate. The method includes the steps of applying the coating system to the metallic substrate to form an initial coating. This initial coating is then subjected to a first stage heat treatment whereby the sacrificial binder is removed, a second stage heat treatment under a reducing atmosphere whereby the metallic compounds are reduced to their elemental metal and a third stage heat treatment whereby the residual metals form a corrosion suppressing alloy coating on the metallic substrate. According to another aspect of the disclosure, the metal incorporated in the particles includes at least one member of the group consisting of aluminum, cadmium, magnesium, zinc and alloys thereof, with the sacrificial binder being selected from a group consisting of polyurethanes, epoxies, neutral resins, acidic resins, acrylates, polyesters and blends thereof.

BRIEF DESCRIPTION OF THE DRAWING(S)

The disclosure will be more fully understood from the following detailed description, taken in connection with the accompanying drawings, in which.

It should be noted that these Figures are intended to illustrate the general characteristics of methods, structures and/or materials utilized in certain example embodiments and to supplement the written description provided below. These drawings are not, however, drawn to scale and will not reflect the precise structural or performance characteristics of any given embodiment and, accordingly, should not be interpreted as unduly defining or limiting the range of values or properties encompassed by example embodiments.

DETAILED DESCRIPTION

As detailed above, although there are a number of methods for forming protective layers on an iron or steel surface, many of these coatings utilize a polymeric component that is incompatible with subsequent high temperature operations, e.g., welding and brazing. There remains a need, therefore, for an improved anti-corrosion coating that provides at least a combination of both satisfactory corrosion protection and improved heat resistance for steel substrates. Other advantages of the disclosed compositions and methods will be discussed further, infra.

Figure 1A:
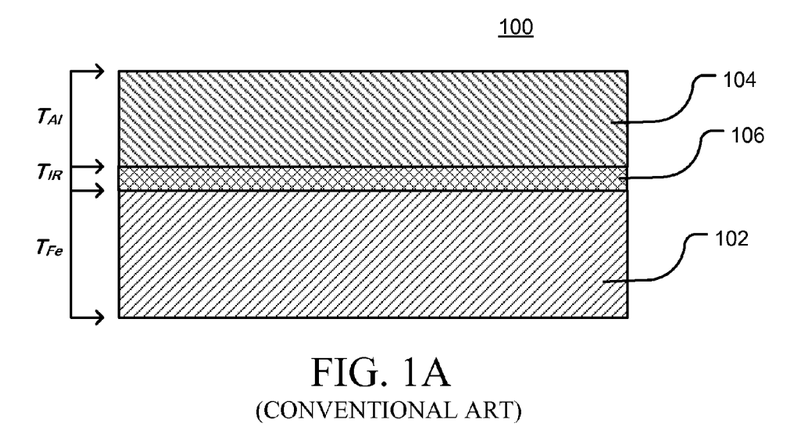
FIGS. 1A and 1B illustrate a conventional method of forming an aluminum-rich outer protective layer.
Figure 1B:
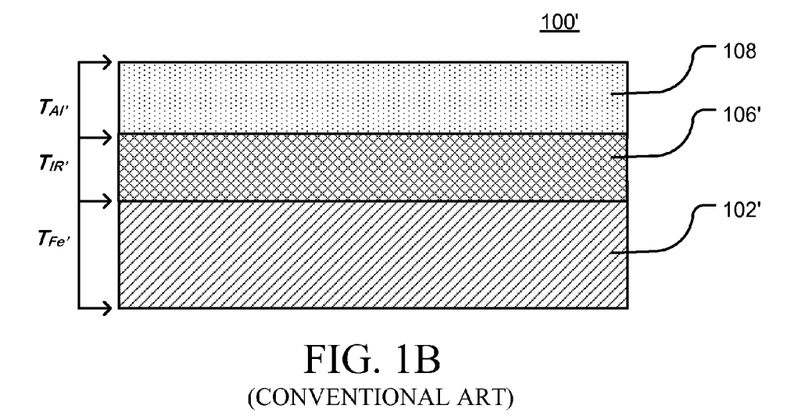

Conventional methods for applying anti-corrosion coatings to steel that provide a combination of corrosion protection and heat resistance for steel substrates could utilize a number of techniques including, for example, hot dip coating and aluminizing, for forming the protective layer. Hot dip coating, as illustrated in FIGS. 1A and 1B, involves passing the steel substrate through a molten metal bath of the coating metal or metal alloy. When the molten metal is zinc, the process is commonly referred to as hot-dip galvanizing and results in a layer of zinc carbonate as the zinc coating subsequently reacts with oxygen and carbon dioxide to form the characteristic crystallization surface patterning associated with "galvanized" steel. During the hot dip coating process, the coating metal, whether zinc, aluminum or other metal(s), forms a metallurgical bond between coating metal and the surface of the steel substrate with a range of iron alloys represented in a transition or interface region. Further, the elevated temperatures to which the steel substrate is exposed during a hot dip coating process can reduce the strength of the substrate.

The term "galvanized," which properly refers to a substrate metal to which a zinc coating has been applied by using a galvanic cell (also known as electroplating), is commonly also used to refer protective layers formed by hot dip zinc coating. One significant distinction between the protective layers resulting from the two processes is that a hot dip zinc coating typically produces a much thicker, durable coating having a matte gray surface, whereas genuine galvanizing (electroplating) tends to produce a very thin, shiny coating that lacks the characteristic interface region produced by the hot dip coating process.

The effects of a conventional hot dip coating process are illustrated in FIGS. 1A and 1B. As illustrated in FIG. 1A, a steel substrate 102 having a thickness $T_{Fe}$ is subjected to a hot dip coating process to form a coated substrate 100 having a protective aluminum layer 104 having a thickness $T_{Al}$. As the steel substrate is passed through the molten aluminum, an interface region 106 having a thickness $T_{IR}$ is formed from a range of iron/aluminum alloys $Fe_yAl_z$.

As illustrated in FIG. 1B, in order to improve the weldability of the coated substrate, subsequent to the hot dipping process, the coated substrate may be subjected to additional thermal processing in order to diffuse some of the iron from the interface region and the substrate through the aluminum layer to form a modified coated substrate 100'. This additional thermal processing is designed to diffuse iron through the entire thickness $T_{Al}$ of the aluminum layer 104 to form an aluminum-rich Fe/Al alloy layer 108. This additional thermal processing, however, also tends to increase the thickness of the interface region 106' and, by consuming a portion of the original substrate, reduce the thickness of the residual steel substrate 102'. The aluminum-rich alloy layer and the interface region provide corrosion protection for the underlying steel substrate and improve the weldability of the coated substrate.

As will be appreciated by one skilled in the art, one issue associated with the conventional coating method illustrated in FIGS. 1A and 1B is that the thermal processing treating time necessary to achieve the desired degree of alloying within the initial coating material can be significant. Another issue associated with the conventional coating method is that the composition and distribution of iron throughout alloy layer can often be difficult to control, causing the adhesion characteristics of the alloy layer(s) to vary significantly. This variability is attributed, at least in part, to the fact that the diffusion mechanism within the coating system is not simple diffusion but is, instead, reaction diffusion. And further, as the interfacial region becomes thicker, the material reliability is reduced and the welding performance tends to degrade.

Figure 2A:
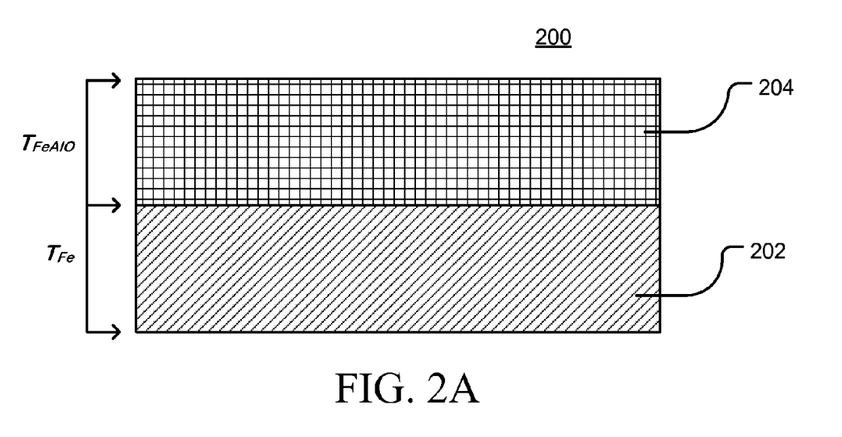
FIGS. 2A and 2B illustrate a method of forming an aluminum-rich outer protective layer according to the present disclosure.

An example method according to the present disclosure is illustrated in FIGS. 2A and 2B. As illustrated in FIG. 2A, a steel substrate 202 having a thickness $T_{Fe}$ is subjected to a coating process to form a coated substrate 200 having a protective layer 204 having a thickness $T_{FeAlO}$. Unlike the process illustrated in FIGS. 1A and 1B, the protective layer 204 is applied under lower temperature conditions, thereby suppressing formation of the interface region created during a hot dipping process. The protective layer includes at least a polymeric binder, an anodic metal compound, typically an aluminum compound, and an iron compound, the aluminum and iron compounds being selected from the base metal, metal alloys, oxides, hydroxides and mixtures thereof. Examples of such materials include Al, $Al_2O_3$, Fe, $Fe_3O_4$ and $Fe_2O_3$, generally provided as fine particulates.

Figure 2B:
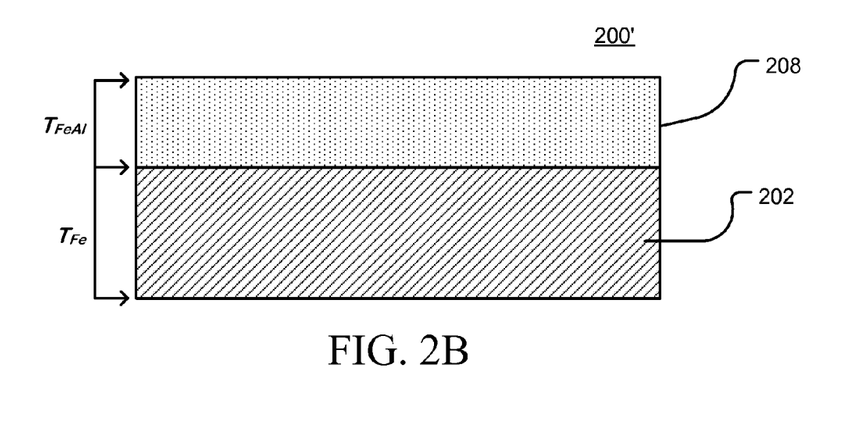

As illustrated in FIG. 2B, the coated substrate 200 is then subjected to additional thermal processing that 1) removes the organic component of the coating, 2) reduces the aluminum and iron compounds to the base metals according to, for example, Reactions IX and x, $$4H_2+Fe_3O_4 \rightleftharpoons 3Fe+4H_2O \quad (IX)$$

$$3H_2+Al_2O_3 \rightleftharpoons 2Al+3H_2O \quad (X)$$

and 3) forms an Fe/Al alloy layer 208 on the modified coated substrate 200'. As a result of the distribution of iron and aluminum throughout layer 204, the thermal processing utilized in accord with the disclosed method need not be configured to allow for diffusion of iron from the steel substrate throughout the protective layer, thereby reducing the need for thermal processing and further suppressing both formation of an interface region and consumption of the steel substrate.

In general, aluminum compounds including, for example, aluminum oxide, will be incorporated as the preferred anodic metal particulates. In practice, however, any anodic metal that creates sufficient potential difference, e.g., at least about 0.02 volt, from the metal substrate may be used according to the methods detailed in the disclosure.

Figure 3A:
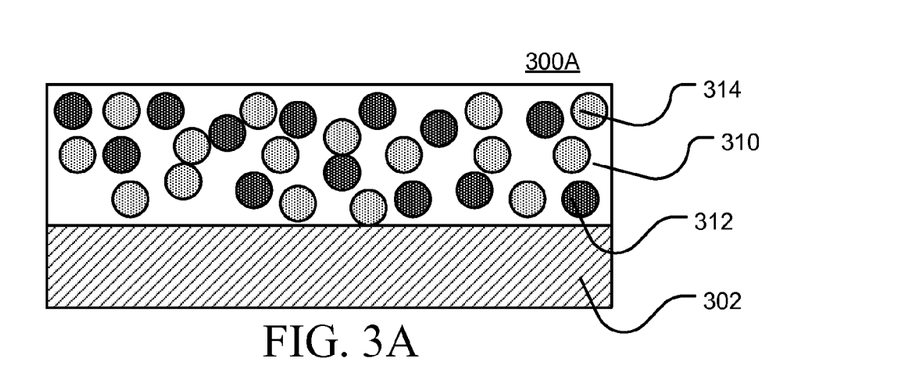
FIGS. 3A to 3D illustrate in greater detail a method according to the present disclosure as illustrated in FIGS. 2A and 2B.
Figure 3B:
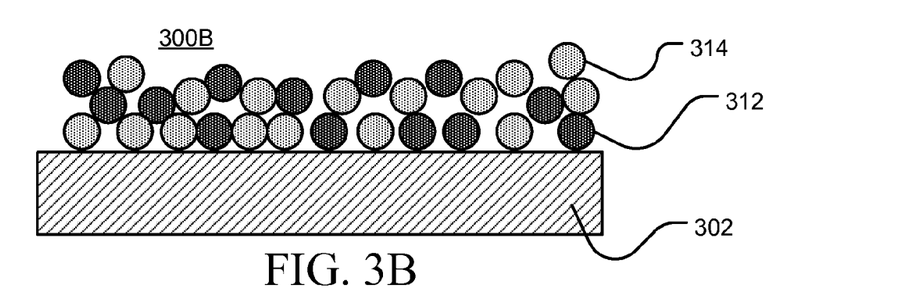

FIGS. 3A-3D provide a more detailed example of a manner of practicing the method illustrated in FIGS. 2A and 2B. As illustrated in FIG. 3A, particles of at least one anodic material 312 and particles of an iron compound 314 are distributed in a polymeric matrix 310 to form a coating composition. This coating composition is then applied to a steel substrate 302 by, for example, spraying, brushing, dipping or rolling, and then dried, cured or otherwise fixed to the substrate to form a coated substrate 300A. As illustrated in FIG. 3B, the coated substrate 300A is then subjected to thermal processing under conditions sufficient to remove substantially all the organic portion of the coating composition.

Figure 3C:
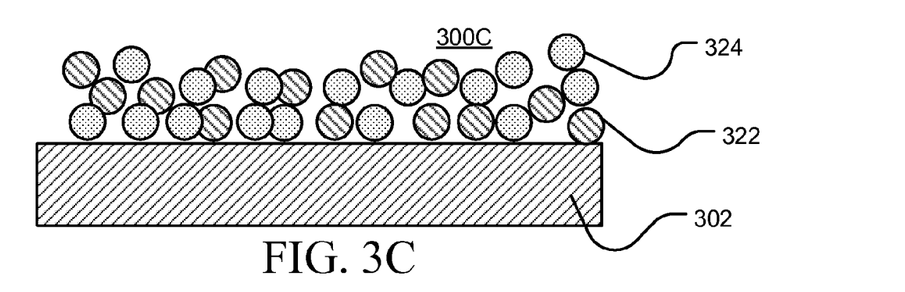
Figure 3D:
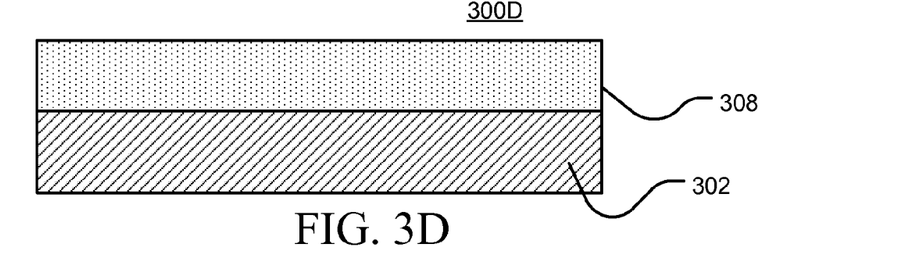

Removing the organic portion of the coating composition leaves a residual layer of the anodic material and iron compound particles on the substrate 302 to form a first intermediate coated substrate 300B. As illustrated in FIG. 3C, the residual layer of anodic material and iron compound particles are then subjected to additional thermal processing under reducing conditions sufficient to convert the anodic material and iron compound particles to a corresponding layer of base metal particles 322, 324 and produce a second intermediate coated substrate 300C. As illustrated in FIG. 3D, the layer of base metal particles can then be subjected to additional thermal processing sufficient to form an alloy layer 308 from the base metal particles, the stoichiometry of the alloy layer being largely determined by the relative molar concentrations of the base metal particles from which it is formed.

Figure 6:
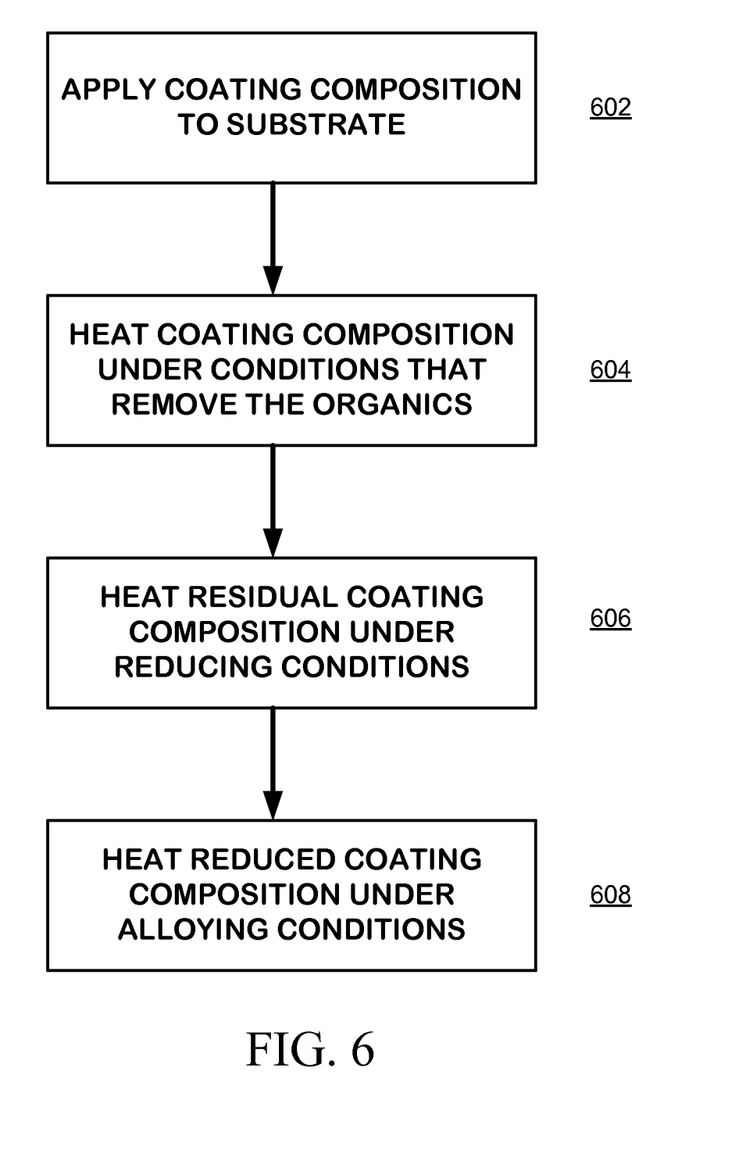
FIG. 6 illustrates an example process flow according to the present disclosure.

FIG. 6 illustrates the process flow described supra in connection with FIGS. 3A-3D including the application of the coating 602, heating the coating under conditions sufficient to remove the organic component 604, heating the residual particles under reducing conditions to convert the particles to their base metals 606 and heating the converted base metals under conditions that will tend to alloy the various particles 608 and form a protective alloy layer on the substrate.

As will be appreciated by those skilled in the art, the succession of thermal processes detailed above may be performed in a single reactor by altering the temperature profile and/or the composition of the atmosphere surrounding the coating compositions. Depending on the materials and processing conditions for example, the processing illustrated in FIGS. 3B and 3C can be performed substantially simultaneously by using a reducing atmosphere, e.g., $H_2$ and/or $NH_3$ gases, under temperature and pressure conditions that also remove the organic component of the coating composition. Alternatively, the organic component of the coating can be removed under an oxidizing atmosphere with the residual metal oxide(s) and/or hydroxide(s) subsequently being treated with a reducing atmosphere.

Figure 4A:
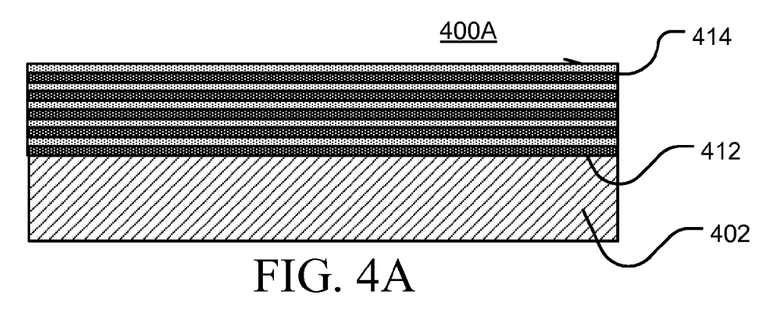
FIGS. 4A and 4B illustrate in greater detail an alternative method according to the present disclosure as illustrated in FIGS. 2A and 2B.
Figure 4B:
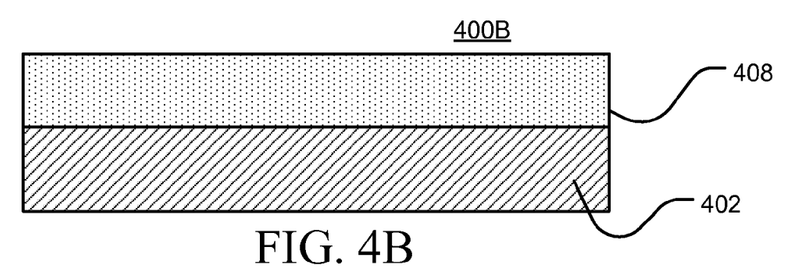

FIGS. 4A and 4B illustrate another example embodiment of a method according to the disclosure in which alternating layers of a first coating composition 412, which contains particles of a first type in a polymeric binder, and a second coating composition 414, which contains particles of a second type in a polymeric binder, are deposited on a steel substrate 402. The alternating layers are then processed as detailed supra in connection with FIGS. 3A-3D, to form an iron alloy coating layer 408.

Figure 5A:
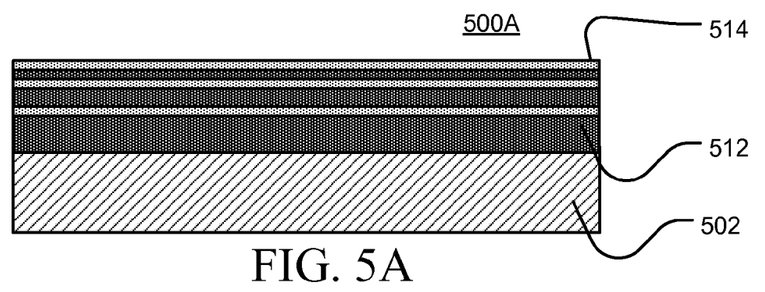
FIGS. 5A and 5B illustrate in greater detail an alternative method according to the present disclosure as illustrated in FIGS. 2A and 2B.
Figure 5B:
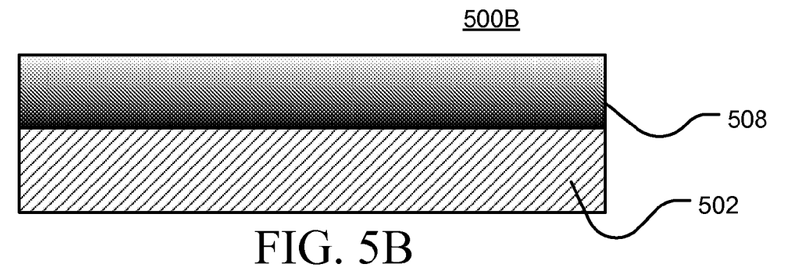

FIGS. 5A and 5B illustrate yet another example embodiment of a method according to the disclosure in which alternating layers of a first coating composition 512, which contains particles of a first type FT in a polymeric binder, and a second coating composition 514, which contains particles of a second type ST in a polymeric binder, are deposited on a steel substrate 502. The alternating layers are then processed as detailed supra in connection with FIGS. 3A-3D, to form an iron alloy coating layer 508 in which the stoichiometry $FT_yST_z$ varies across the thickness of the coating layer. Although illustrated in FIG. 5B as having a single tapering concentration profile, the example embodiment of the method illustrated in FIGS. 5A and 5B may be used to produce a range of concentration profiles. Further, as will be appreciated by those skilled in the art, additional alloying constituents may be introduced in varying concentrations in the different layers 512, 514 to provide even greater control of the properties of the resulting protective layer 508.

Figure 7A:
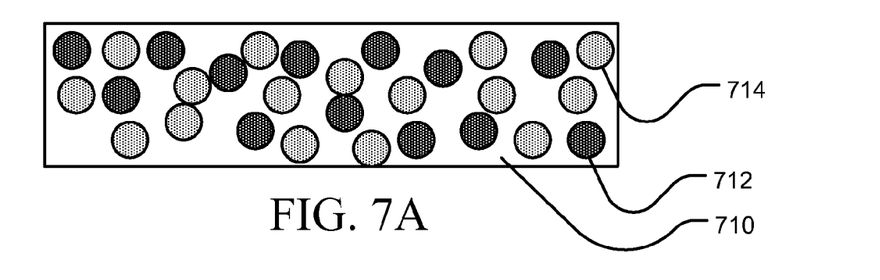
FIGS. 7A to 7C illustrate in greater detail the composition of example coating compositions useful in practicing the method according to the present disclosure.
Figure 7B:
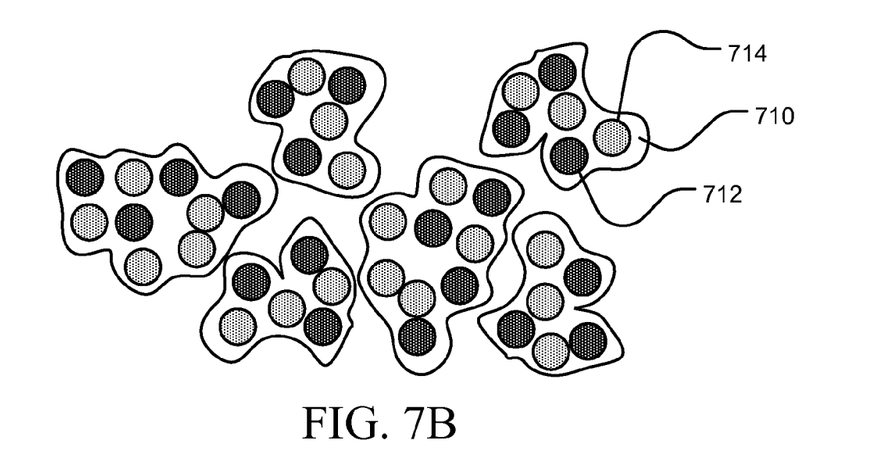
Figure 7C:
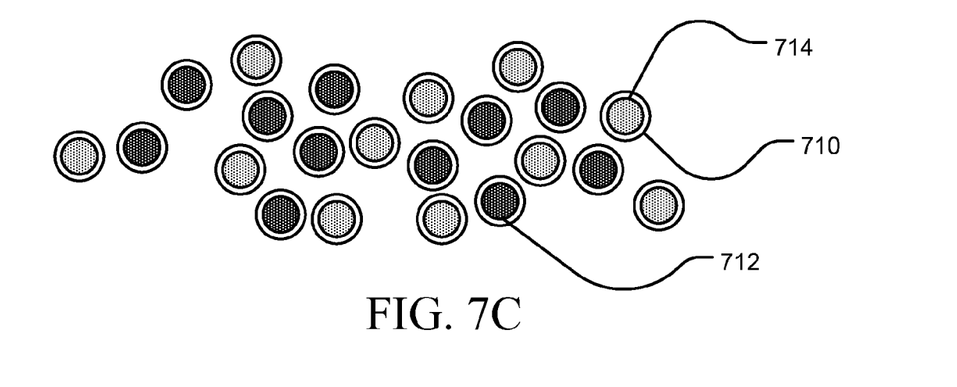

As illustrated in FIGS. 7A-7C, and as will be appreciated by those skilled in the art, the coating composition may be formulated and applied to the substrate using a number of techniques. As illustrated in FIG. 7A, the alloying material particles 712, 714 may be dispersed in a polymeric fluid 710 that can be applied to the substrate by painting, spraying, rolling or dipping and then dried, cured or otherwise solidified sufficiently to remain in place for subsequent processing.

As illustrated in FIG. 7B, the alloying material particles 712, 714 may be dispersed in larger particles of a polymeric composition. These composite particles can then be used to form suspensions, emulsions or powders and then applied to substrate using a variety of techniques including, for example, suspension, emulsion or by powder coating. Although the particles illustrated in FIG. 7B include two types of particles, corresponding composite particles could be manufactured with a single type of particle for use in methods as illustrated in FIGS. 4A-5B and/or for formulating coating compositions of varying effective stoichiometry.

As illustrated in FIG. 7C, the alloying material particles 712, 714 may be individually provided with a relatively thin coating of one or more polymeric compositions. These particles can then be used to form suspensions, emulsions or powders and then applied to substrate using a variety of techniques including, for example, suspension, emulsion or by powder coating. The particles illustrated in FIG. 7C could be using in practicing methods as illustrated in FIGS. 4A-5B and/or for formulating coating compositions of varying effective stoichiometry.

While the present disclosure as included descriptions of various embodiments, it should be understood that these embodiments are not intended to limit the disclosure and that one of skill in the art, guided by the present disclosure, can adopt the compositions and formulations disclosed to provide various combinations of properties more closely tailored for specific applications. Accordingly, the present disclosure is intended to encompass such alternatives, modifications, and equivalents as may be included within the spirit and scope of the appended claims.

I claim:

1. A method of forming a protective coating on a metallic substrate consisting of:
    depositing a first coating composition on a surface of the substrate, the first coating composition comprising first reducible metallic particles selected from the group consisting of aluminum-containing compounds, zinc-containing compounds, or a mixture thereof, second reducible metallic particles including iron-containing compounds thereof, and a polymeric binder;
    depositing a second coating composition on a surface of the first coating composition, the second coating composition comprising first reducible metallic particles selected from the group consisting of aluminum-containing compounds, zinc-containing compounds, or a mixture thereof, second reducible metallic particles including iron-containing compounds, and a polymeric binder;
    treating the coating compositions under conditions sufficient to remove substantially all of the polymeric binder from the first and second coating compositions to form a residual layer comprising the first and second metallic particles of the first and second coating compositions;
    treating the residual layer under conditions sufficient to reduce the first and second metallic particles of the first and second coating compositions and form a reduced layer of first metal particles and second metal particles of the first and second coating compositions; and
    treating the reduced layer of first and second metal particles of the first and second coating compositions under conditions sufficient to form an alloy layer having a thickness on the substrate surface.

2. The method of forming a protective coating on a metallic substrate according to claim 1, wherein:
    the first reducible metallic particles further include a compound selected from the group consisting of aluminum oxide, aluminum hydroxide and mixtures thereof; and
    the second reducible metallic particles further include a compound selected from the group consisting of ferrous oxide, ferric oxide and mixtures thereof.

3. The method of forming a protective coating on a metallic substrate according to claim 1, wherein treating the coating composition under conditions sufficient to remove substantially all of the polymeric binder further comprises:
    heating the coating composition under an oxidizing atmosphere.

4. The method of forming a protective coating on a metallic substrate according to claim 1, wherein treating the coating composition under conditions sufficient to remove substantially all of the polymeric binder further comprises:
    heating the coating composition under a reducing atmosphere.

5. The method of forming a protective coating on a metallic substrate according to claim 1, wherein treating the residual layer under conditions sufficient to reduce the first and second reducible metallic particles further comprises:
    heating the residual layer under a reducing atmosphere.

6. The method of forming a protective coating on a metallic substrate according to claim 5, wherein:
    the reducing atmosphere includes a gas selected from the group consisting of hydrogen, ammonia and mixtures thereof.

7. The method of forming a protective coating on a metallic substrate according to claim 5, wherein:
    the reducing atmosphere consists essentially of hydrogen.

8. A method of forming a protective coating on a metallic substrate comprising:
    depositing a first coating composition on a surface of the substrate, the first coating composition consisting of first metallic particles and a polymeric binder and a first thickness;
    depositing a second coating composition on a surface of the first coating composition, the second coating composition comprising second metallic particles and a polymeric binder, the first and second coating compositions cooperating to form an initial protective coating;
    treating the initial protective coating composition under conditions sufficient to remove substantially all of the polymeric binder to form a residual layer comprising a first sublayer comprising the first metallic particles and a second sublayer comprising the second metallic particles;
    treating the residual layer under conditions sufficient to reduce the first and second metallic particles and form a reduced layer comprising a first reduced sublayer comprising first metal particles and a second reduced sublayer comprising second metal particles; and
    treating the reduced layer under conditions sufficient to cause the first and second reduced sublayers to form an alloy layer on the substrate surface.

9. The method of forming a protective coating on a metallic substrate according to claim 8, further comprising:
    depositing a third coating composition on a surface of the second coating composition, the third coating composition comprising first metallic particles and a polymeric binder; and
    depositing a fourth coating composition on a surface of the third coating composition, the fourth coating composition comprising second metallic particles and a polymeric binder, the first, second, third and fourth coating compositions cooperating to form an initial protective coating,
    wherein the first coating composition has a first thickness $T_1$, the second coating composition has a second thickness $T_2$, the third coating composition has a third thickness $T_3$ and the fourth coating composition has a fourth thickness $T_4$.

10. The method of forming a protective coating on a metallic substrate according to claim 9, wherein:
    a $T_1:T_3$ ratio is about 1:2 to 2:1; and
    a $T_2:T_4$ ratio is about 1:4 to 4:1.

11. The method of forming a protective coating on a metallic substrate according to claim 9, wherein:
    a $T_1:T_2$ ratio is about 1:2 to 2:1; and
    a $T_3:T_4$ ratio is about 1:2 to 2:1.

12. The method of forming a protective coating on a metallic substrate according to claim 9, wherein:
    a $T_1:T_3$ ratio is about 1:1; and
    a $T_2:T_4$ ratio is about 1:1.

13. A method of forming a protective coating on a steel substrate comprising:
    depositing a first coating composition on a surface of the steel substrate, the first coating composition consisting of first reducible metallic particles selected from the group consisting of aluminum-containing compounds, zinc-containing compounds, or a mixture thereof, and a polymeric binder;
    depositing a second coating composition on a surface of the first coating composition, the second coating composition comprising second reducible metallic particles including iron-containing compounds, and a polymeric binder;
    depositing a third coating composition on a surface of the second coating composition, the third coating composition comprising third reducible metallic particles including aluminum-containing compounds, zinc-containing compounds, or a mixture thereof, and a polymeric binder,
    wherein the first and third reducible metallic particles are anodic relative to the second reducible metallic particles and the steel substrate, and wherein the first, second, and third coating compositions form an initial protective coating;
    treating the initial protective coating under conditions sufficient to remove substantially all of the polymeric binder of the first, second, and third coating compositions to form a residual layer comprising the first reducible metallic particles, the second reducible metallic particles, and the third reducible metallic particles; and
    treating the residual layer under conditions sufficient to cause the first, second, and third reducible metallic particles to form an alloy layer on the steel substrate surface.

14. The method of forming a protective coating on a steel substrate according to claim 13, wherein the first and third reducible metallic particles consist of aluminum oxide, aluminum hydroxide and mixtures thereof.

15. The method of forming a protective coating on a steel substrate according to claim 13, wherein the second reducible metallic particles consist of ferrous oxide, ferric oxide and mixtures thereof.

16. The method of forming a protective coating on a steel substrate according to claim 13, wherein the polymeric binder of the first coating composition, the polymeric binder of the second coating composition, and the polymeric binder of the third coating composition are the same material.

17. The method of forming a protective coating on a metallic substrate according to claim 13, wherein the residual layer comprises a first residual sublayer comprising the first reducible metallic particles, a second residual sublayer comprising the second reducible metallic particles, and a third residual sublayer comprising the third reducible metallic particles.

18. The method of forming a protective coating on a metallic substrate according to claim 1, wherein the stoichiometry of the first metal and the second metal varies across the thickness of the alloy layer.

19. The method of forming a protective coating on a metallic substrate according to claim 1, wherein the first reducible metallic particles in the first coating composition are the same as the first reducible metallic particles in the second coating composition.

20. The method of forming a protective coating on a metallic substrate according to claim 1, wherein the second reducible metallic particles in the first coating composition are the same as the second reducible metallic particles in the second coating composition.

* * * * *